United States Patent Office 3,236,122
Patented Feb. 22, 1966

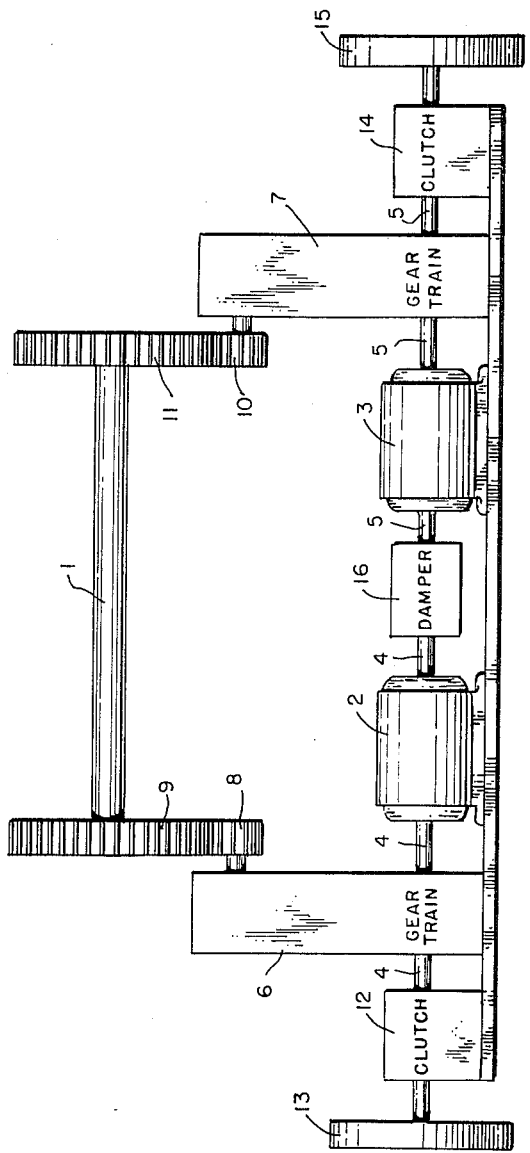

3,236,122
DAMPED POWER DRIVE
George A. Biernson, Concord, Mass., assignor to the United States of America as represented by the Secretary of the Army
Filed Aug. 23, 1963, Ser. No. 304,290
4 Claims. (Cl. 74—574)

This invention relates to geared power mechanisms for actuating servomechanisms.

An object of this invention is to provide a means of damping mechanical oscillations and transients due to gear-train compliance and backlash.

Another object is to provide means to insure greater accuracy in servomechanisms.

A further object is to provide means to increase the inertia of a motor system during low speed operation and thereby decrease servomechanism error.

Many servomechanisms use a gear train to couple the motor to the controlled member in order to provide an effective match between the torque and speed capabilities of the motor and the torque and speed requirements of the controlled member. When high accuracy is required, some means is needed to preload the gear trains to remove backlash. One means that is particularly effective for high power applications is to use two motors which are coupled to the controlled member through independent gear trains. Under quiescent conditions, the motors are controlled to exert a constant opposing torque against one another, and this torque preloads the two sets of gear trains.

One difficulty with this method of eliminating backlash is that a mechanical resonance can occur between the inertias of the two motors due to the compliance in the interconnecting gear train. This resonance can limit the bandwidth achievable in the control loop closed around the motors, and thereby limit the accuracy achievable in the control system. The greater the inertias of the motors relative to the reflected inertia of the controlled member, the more harmful is this resonance mode between the two motors. This invention eliminates resonance between the two motors of the drive system heretofore described by coupling the motor shafts together by a damper. In addition, each motor is connected to a flywheel through a clutch so that the additional inertia of the flywheels can be connected to the motors during low speed operation to provide greater accuracy.

These and other objects and advantages of this invention will become apparent from the detailed description of the invention given in connection with the drawing in which the figure is a diagrammatic representation of the invention.

In the drawing a shaft 1 of a controlled member is to be driven by motors 2 and 3. Motor shafts 4 and 5 are coupled to shaft 1 through gear trains 6 and 7 and additional gears 8, 9, 10 and 11. A flywheel 13 is coupled to motor 2 through a clutch 12, and a flywheel 15 is coupled to motor 3 through a clutch 14. A damper 16 is connected between shafts 4 and 5.

The motor shafts 4 and 5 are preferably aligned axially so that they so that they can be directly coupled together by the damper 16 as shown in the figure. Care should be taken to keep backlash and compliance low in this coupling through the damper. The gear trains 6 and 7 are constructed such that the motors rotate in the same direction so that there is no steady-state slippage in the damper.

It is often convenient to use motors with double-ended shafts and to couple the gear trains to the opposite ends of the shafts from the damper, as is shown in the figure. However, this configuration is not an essential characteristic of the invention, and the gear train may be coupled to the same end of the shaft as the damper.

The preloading torque that the motors exert against one another to preload the gear train is often made much less than the maximum output torque of one motor. Consequently, when the servomechanism commands the motors to deliver maximum output torque to the controlled member, both motors exert torques through the gear trains in the same direction. However, when the servomechanism commands a small output torque, the motors exert opposing torques through the gear trains. Therefore, a transient occurs as the output command torque is increased from zero to its maximum value, at the point where the motor torques change from opposing to aiding. With a conventional drive, this transient can be quite severe and result in clanking of the gears. With the damper-drive system described herein, the transient is greatly reduced.

Load torques are often an important cause of inaccuracy in a servomechanism. An effective means of reducing the error produced by a load torque is to add inertia to the motor. With the increased inertia, it is possible to increase the gain in the amplified which drives the motor and thereby to increase the gain in the amplifier which drives the motor and thereby to increase the stiffness of the servomechanism feedback loop. As the stiffness increases, the servomechanism error produced by a load torque decreases.

A difficulty with adding inertia to the motor shaft is that it reduces the acceleration capability of its motor. High acceleration capability is usually required only under "slew" conditions, during which high accuracy is not required. In the high accuracy or "track" condition, accelerations are generally small. Therefore, the additional inertia of flywheels 13 and 15 is coupled to the motors 2 and 3 through clutches 12 and 14 respectively, which can disengage the inertia during slew.

Adding inertia to the motors increases the problem of oscillation between the motors and makes the addition of the damper 16 all the more important. To achieve maximum effectiveness in the damping, compliance and backlash between the additional inertia and the motor shaft, as well as between the motor shaft and the damper should be kept as small as possible.

What is claimed is:

1. A lash-free gearing mechanism comprising: first and second coaxially mounted motors, each of said motors having a double-ended shaft; damper means connected to said motor shafts which extend between said motors; a shaft for mounting a controlled member; and first and second gear trains connected between said controlled member shaft and the ends of said motor shafts which extend from the ends of said motors opposite the motor ends adjacent said damper means.

2. The gearing mechanism of claim 1 further comprising: a clutch connected to each of said motor shafts and a flywheel connected to each of said clutches.

3. A lash-free gearing mechanism comprising: a first shaft for mounting a controlled member; first and second motors, each having an output shaft; a first gear train for connecting said first motor shaft to said first shaft; a second gear train for connecting said second motor shaft to said first shaft; and damper means connected directly to bother of said motor shafts and acting independently of said gear trains for reducing mechanical oscillations and transients caused by compliance and backlash of said gear trains.

4. The gearing mechanism of claim 3 which further comprises means for adding inertia to each of said motors during periods when greater accuracy is required.

References Cited by the Examiner

UNITED STATES PATENTS 2,381,325　8/1945　Wahl _____ 74—574

FOREIGN PATENTS 506,067　5/1939　Great Britain.

OTHER REFERENCES

Metron Instrument Co., Technical Data sheet, November 1953, page 1.

BROUGHTON G. DURHAM, *Primary Examiner.*

W. S. RATLIFF, *Assistant Examiner.*